April 26, 1960
W. DÖLL
2,933,863
APPARATUS FOR AUTOMATICALLY SUPPLYING WORK PIECES TO
GLASS TREATING MACHINES FOR THE OPTICAL INDUSTRY
Filed Sept. 11, 1958
3 Sheets-Sheet 1
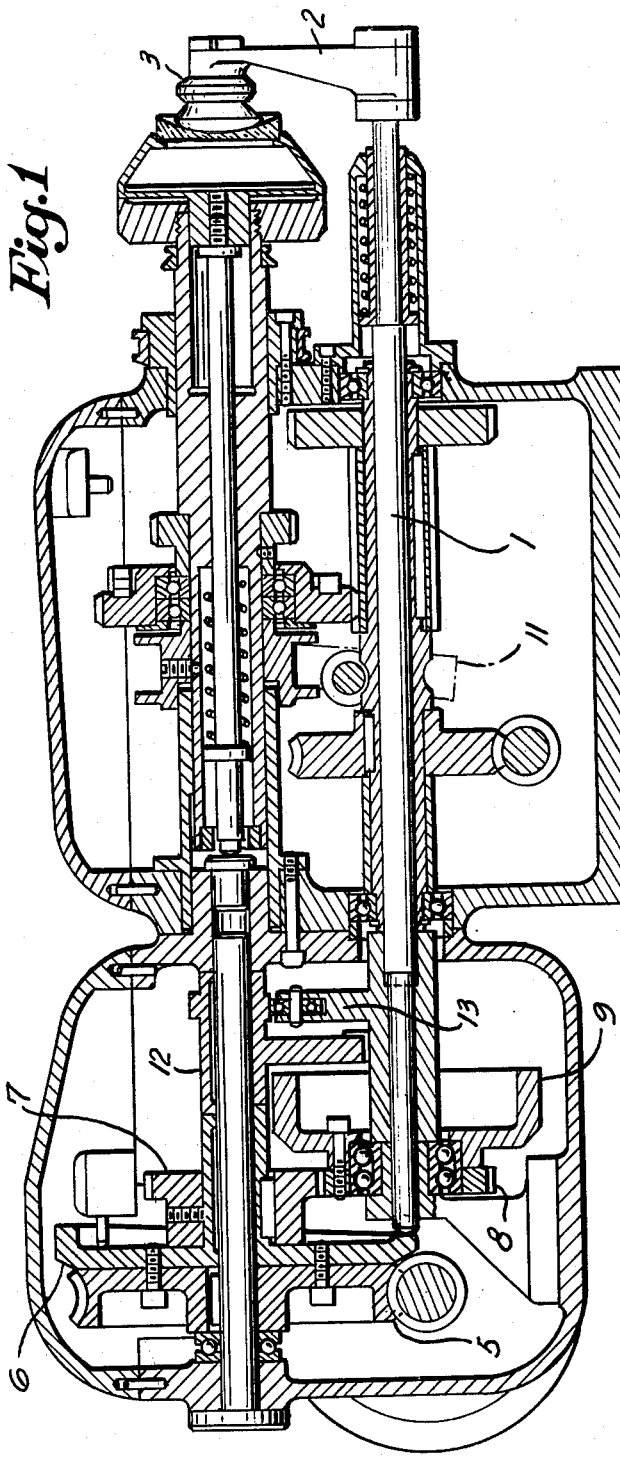
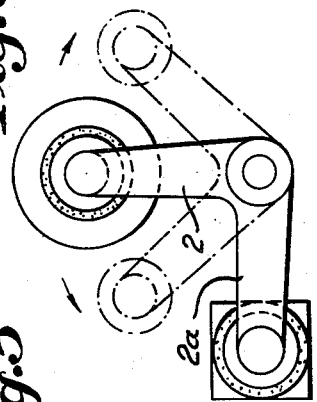
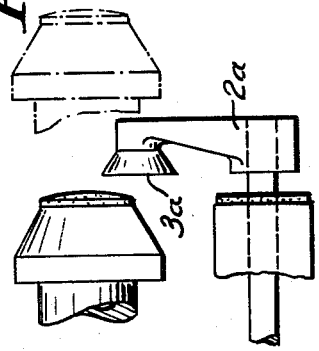
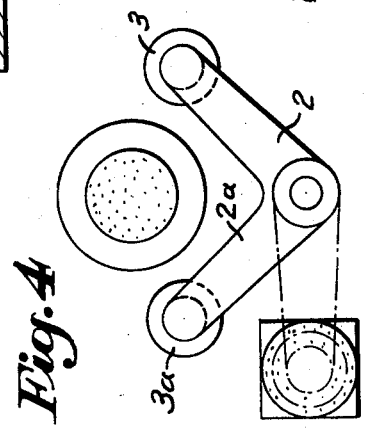
INVENTOR.
WILHELM DÖLL
BY Richards & Geier
ATTORNEYS

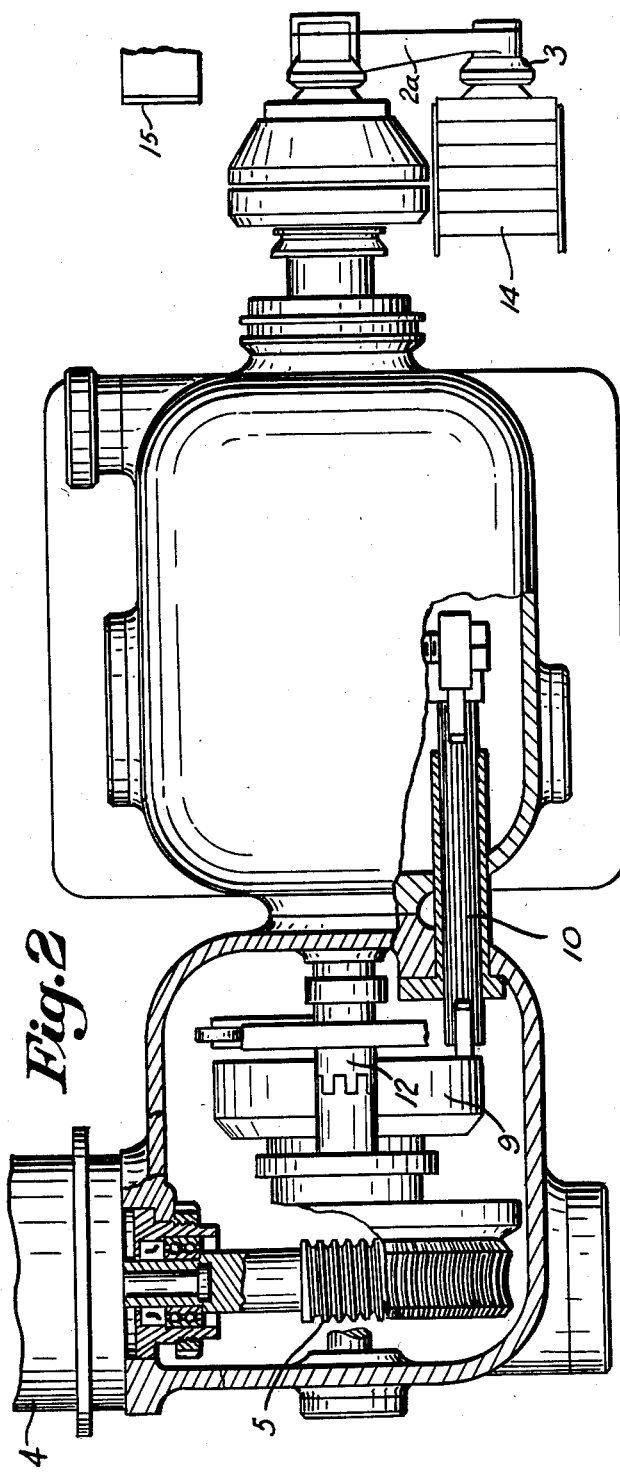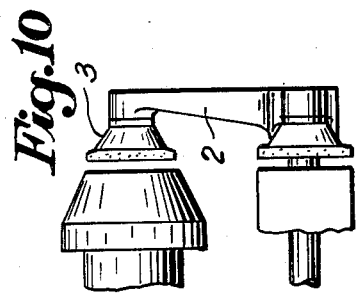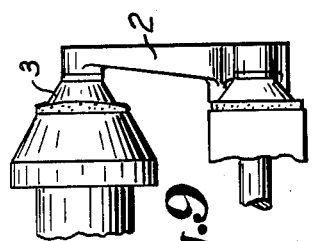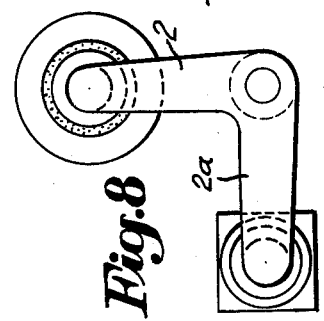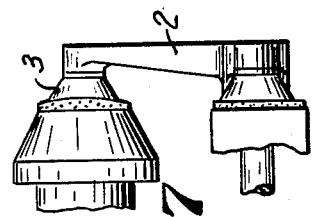

April 26, 1960 W. DÖLL 2,933,863
APPARATUS FOR AUTOMATICALLY SUPPLYING WORK PIECES TO
GLASS TREATING MACHINES FOR THE OPTICAL INDUSTRY
Filed Sept. 11, 1958 3 Sheets-Sheet 3

INVENTOR.
WILHELM DÖLL
BY Richards Geier
ATTORNEYS

United States Patent Office 2,933,863
Patented Apr. 26, 1960

2,933,863
APPARATUS FOR AUTOMATICALLY SUPPLYING WORK PIECES TO GLASS TREATING MACHINES FOR THE OPTICAL INDUSTRY

Wilhelm Döll, Burgsolms, Kreis Wetzlar, Germany

Application September 11, 1958, Serial No. 760,393

Claims priority, application Germany September 12, 1957

1 Claim. (Cl. 51—237)

This invention relates to an apparatus for the optical industry for automatically supplying glass treating machines, and refers more particularly to a device capable of being steered and automatically supplying work pieces to machines producing optical equipment, such as radial milling machines and/or polishing machines for treating lenses, prisms, and other work pieces. Such devices are also operable for automatically withdrawing completed work pieces from said machines.

Machines used for producing optical equipment which are now known in the art, such as radial milling machines and polishing machines are provided with means switching off automatically the machines after the completion of an operation, so that they operate substantially automatically, with the exception that the lenses or other work pieces have to be inserted into the machines by hand, and similarly removed by hand upon completion of the operation. This is equally true for centering machines and other glass treating machines used in the optical industry.

An object of the present invention is to increase the production of such machines and to improve their working operations.

Another object is to replace the manual operations of supplying work pieces to such machines, and removing them therefrom, by automatically operable devices.

Other objects of the present invention will become apparent in the course of the following specification.

In accomplishing the objects of the present invention, it was found desirable to provide a device which is actuated by a steering drive and which is used in conjunction with glass treating machines of the optical industry, such as radial milling machines and polishing machines, whereby this device withdraws lenses or other work pieces automatically from a storage container, and introduces them into the machine. This device, upon the completion of the operation of the machine, withdraws the finished work pieces automatically from the machine and places them in a storage space outside of the machine.

The invention will appear more clearly from the following detailed description when taken in connection with the accompanying drawings, showing by way of example a device used in conjunction with a radial milling machine.

In the drawings:

Figure 1 is a longitudinal section through a device constructed in accordance with the principles of the present invention.

Figure 2 is a top view of the device shown in Figure 1, some parts being shown in section.

Figures 4 to 10 are diagrams showing the work piece actuating elements in various positions, whereby, Figure 4 shows in end view the work piece carrying arms in an inoperative position.

Figure 5 is a side view of the device shown in Figure 4.

Figure 6 is similar to Figure 4 and shows the arms while they are withdrawing a lens from a supply container.

Figure 7 is a side view of the device shown in Figure 6.

Figure 8 is similar to Figures 4 and 6 and shows the arms while a work piece is being supplied to the machine.

Figure 9 is a side view of the device shown in Figure 8.

Figure 10 is a similar view and shows the arms in a withdrawn position.

Figure 3:
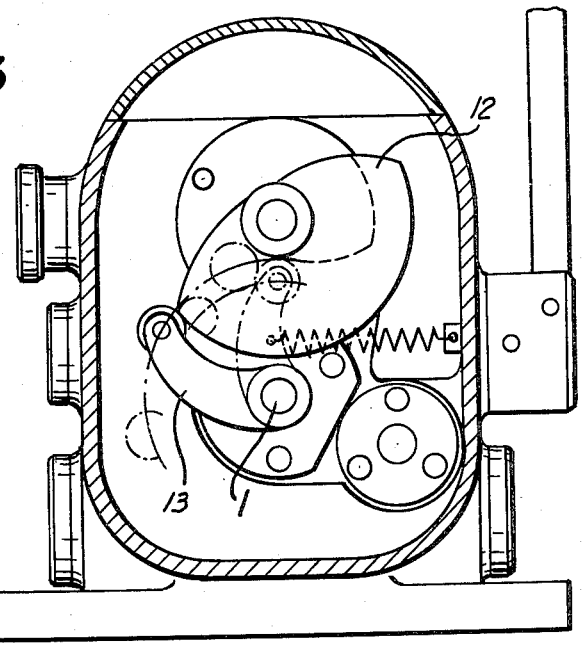
Figure 3 is a transverse section through the device shown in Figures 1 and 2.

Since a radial milling machine is well known in the art, only such parts are shown herein which are necessary for the illustration of the work piece supplying device of the present invention.

This device comprises an actuating shaft 1 which is driven from a steering device having different cams to be described hereinafter, so that the shaft 1 can be turned about its central axis and can be also shifted axially in the direction of said axis.

One end of the shaft projects beyond the casing 20 of the machine and carries two arms 2 and 2a which are firmly connected with the shaft 1. As shown in Figures 4, 6, and 8, the arms 2 and 2a extend substantially at right angles to each other. The outer ends of the arms 2 and 2a carry suction elements 3 which are used to hold lenses or similar work pieces to be supplied to automatically operating machines producing optical equipment for the optical industry, such as radial milling machines and polishing machines.

The movements and the manner of operation of the arms 2 and 2a for supplying a work piece to a radial milling machine is illustrated diagrammatically in Figures 4 to 14 of the drawings.

When the treatment of the lens prism or some other optical work piece is completed by the main machine, a switch constituting a part of this machine, and not shown in the drawings, will switch on automatically a separate motor 4, which is shown in Figure 2, and which operates the device for supplying and withdrawing work pieces, which will be described in greater detail hereinafter.

The motor 4 is operatively connected with a worm gear drive 5 (Fig. 1) which is operatively connected with a cam 6. The cam 6 engages the actuating shaft 1 so that the shaft 1 is movable in the direction of its axis.

A gear 7 is firmly connected with the cam 6 and meshes with a gear wheel 8. The gear wheel 8 is connected with a cam 9 which is connected with one end of a rod 10, while the other end of the rod 10 is connected with a pivoted arm 11. Thus, the arm 11 is actuated by the cam 9 so as to move rearwardly the operating spindle of the machine. Figure 1 illustrates the positions of the various parts of the device and of the pair of carrying arms 2, 2a produced by this drive.

The worm 5 is also connected with a pair of cams 12 which are connected with two operating arms 13. The arms 13 are connected with the shaft 1, and thus the shaft 1 can be turned about its central axis to the extent of 45°. Due to this arrangement, the carrying arm 2 is moved in front of the lens or other work piece, the treatment of which has been completed by the machine. At the same time, the second arm 2 will be moved in front of the supply box 14 containing the work pieces which are still to be treated by the machine. This position of the arms 2 and 2a, after the completion of the movement of the elements of the drive, is illustrated in Figures 6 and 7.

Thereupon, the cam 6 will move the shaft 1 in its axial direction toward the work piece, and then the suction element 3 of the arm 2 will engage the lens which has been completed by the machine, and which has been held by the machine. At the same time, the suction device 3a of the arm 2a will engage a lens which has not been treated as yet in the container 14 and will hold the lens.

In the course of the further rotation of the cam 9, it will actuate by means of the rod 10 and the arm 11 the working spindle of the machine, so that the lens holder (not shown) of the main machine will open and the suction devices of the pair of arms 2, 2a will remove the lens which has been completed from the machine, and at the same time will withdraw an untreated lens from the container 14, this being accomplished by a second axial movement of the shaft produced by the cam 6. This position is illustrated in Figures 8, 9, and 10 of the drawings.

Figure 11:
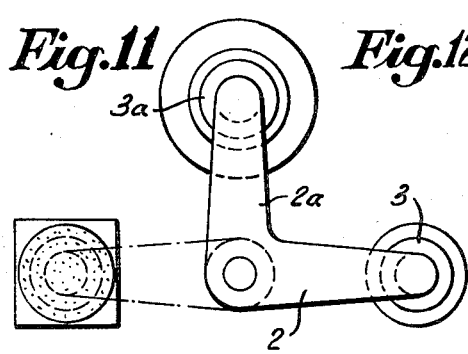
Figure 11 is similar to Figures 4, 6, and 8 and shows the arms while a work piece is being removed from the machine.
Figure 12:
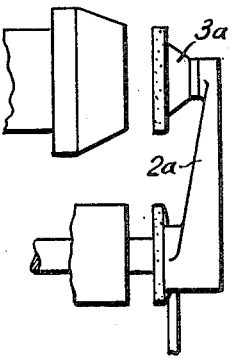
Figure 12 is a side view of the device shown in Figure 11.

Thereupon, the two cams 12 will actuate the shaft 1 by means of the arms 13, and will turn it to the right to the extent of 90° (looking in the direction of Figs. 4, 6, 8, 11 and 13) whereupon the lens which was removed from the container 14, is now located in front of the lens holding device of the machine, while the completed lens which was removed from the machine at the same time, is placed close to a lens removing member 15 which will remove the lens from the suction device 3a. The position of the device and of the arms produced by this further operation of the drive is illustrated in Figures 11 and 12 of the drawings.

Figure 14:
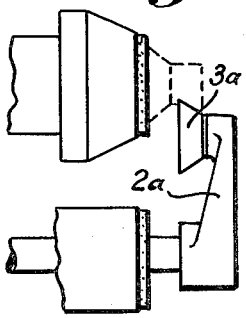
Figure 14 is a side view of the device shown in Figure 13.
Figure 13:
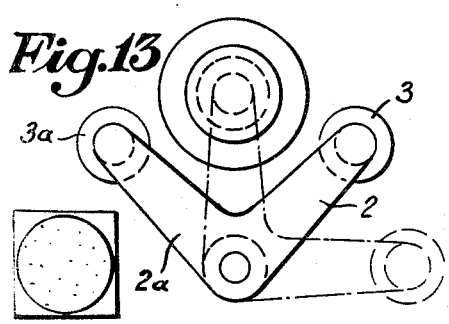
Figure 13 is similar to Figure 4 and shows the arms in their rest position.
Figure 15:
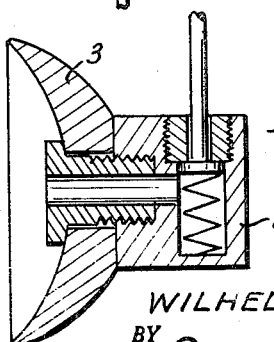
Figure 15 is a sectional view on an enlarged scale illustrating a portion of an arm carrying a suction element.

Finally, the cam 6 will then shift the shaft 1 axially, so that the arm 2a with its suction device 3a will introduce the new lens into the holding device of the machine, while the cam 9 will actuate the gripping of the lens in the machine by means of the rod 10 and the arm 11. Thereupon, the shaft 1 is turned by the pair of cams 12 and the arm 13 about its axis to the extent of 45° so that the pair of gripping arms 2, 2a is moved to their initial position, as illustrated in Figures 13 and 14.

Thereupon, the driving motor 4 is switched off automatically, and at the same time, the main motor of the machine will be actuated to treat the new lens.

It is apparent that the example shown above has been given solely by way of illustration and not by way of limitation, and that it is subject to many variations and modifications within the scope of the present invention. All such modifications and variations are to be included within the scope of the present invention.

What is claimed is:

In combination with a machine for producing optical equipment, said machine having a movable spindle, a work holder, and means operatively connecting said spindle with said work holder for opening and closing said work holder; a device for automatically supplying a work piece to and withdrawing it from said machine, said device comprising a motor connected with said machine and operable upon completion of an operational cycle of said machine, a rotary shaft movable in its axial direction, two holder arms firmly connected with one end of said shaft, suction cups carried by said arms and adapted to carry separate work pieces, a worm drive driven by said motor, a cam actuated by said worm drive and engaging said shaft for axially moving said shaft, a gear firmly connected with said cam, another gear meshing with the first-mentioned gear, another cam connected with said other gear, an arm connected with said spindle, a connecting rod connected with said arm and said other cam, whereby said movable spindle is actuated by said other cam, a pair of cams operatively connected with said worm drive, and two arms connected with said shaft and engaged by said pair of cams to rotate said shaft, whereby the rotary and axial movements of said shaft cause said arms to supply an untreated work piece to said machine and to withdraw a finished work piece from said machine.

References Cited in the file of this patent

UNITED STATES PATENTS

| | | |
|---|---|---|
| 2,704,425 | D'Avaucourt | Mar. 22, 1955 |
| 2,828,588 | Durland | Apr. 1, 1958 |